United States Patent [19]
Racky et al.

[11] 3,900,444
[45] Aug. 19, 1975

[54] FLAME RESISTANT THERMOPLASTIC POLYESTERS

[75] Inventors: Werner Racky, Wiesbaden; Hans-Jerg Kleiner, Bad Soden, Taunus; Walter Herwig, Neuenhain, Taunus, Germany

[73] Assignee: Hoechst Aktiengesellschaft, Frankfurt am Main, Germany

[22] Filed: Oct. 23, 1973

[21] Appl. No.: 408,644

[30] Foreign Application Priority Data
Oct. 25, 1972 Germany.............................. 2252258

[52] U.S. Cl.......................................... 260/45.75 P
[51] Int. Cl.²......................................... C08G 51/62
[58] Field of Search... 260/45.7 P, 502.4 R, 502.4 P

[56] References Cited
UNITED STATES PATENTS

| | | | |
|---|---|---|---|
| 3,157,694 | 11/1964 | Horwood | 260/502.4 |
| 3,322,716 | 5/1967 | Klein et al. | 260/502.4 |
| 3,463,835 | 8/1969 | Budnick | 260/45.7 |
| 3,471,552 | 10/1969 | Budnick | 260/45.7 |
| 3,501,556 | 3/1970 | Weil et al. | 260/502.4 |
| 3,576,793 | 4/1971 | Carroll et al. | 260/45.7 |
| 3,582,510 | 6/1971 | Cannolongo et al. | 260/45.7 |
| 3,664,975 | 5/1972 | Kerst | 260/45.7 |
| 3,751,396 | 8/1973 | Gall | 260/40 |

*Primary Examiner*—V. P. Hoke
*Attorney, Agent, or Firm*—Curtis, Morris & Safford

[57] ABSTRACT

Flame-proof polyesters, which contain alkali salts of phosphinic or diphosphinic acids.

6 Claims, No Drawings

FLAME RESISTANT THERMOPLASTIC POLYESTERS

The present invention relates to flame resistant thermoplastic polyesters.

It is known that additions of red phosphorus or carbon compounds of the phosphorus to thermoplasts can influence the burning behaviour of the polymers and cause a good fire-proofing under certain circumstances.

The difficulty when using phosphoric organic compounds for flame-proof finishing of saturated polyesters is that there often have too low a stability under the preparation and processing conditions necessary for preparing the saturated polyesters, they are sometimes not sufficiently inert from the chemical point of view or have too high a vapor pressure, and therefore volatilize when the polyester is subjected to the effect of heat especially under reduced pressure.

It has now been found that linear, saturated polyesters which contain alkali salts of phosphinic or diphosphinic acids of the general formula

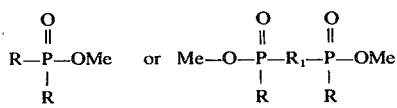

wherein Me represents an alkali metal, preferably sodium, and whereby R represents identical or different saturated, openchained, optionally branched or cyclic alkyl radicals, aryl radicals or arylalkylene radicals, having from 1 to 16 carbon atoms, preferably alkyl radicals, having from 1 to 6 carbon atoms, $R_1$ represents saturated, open-chained, optionally branched or cyclic alkylene radicals, arylene radicals or arylene-alkylene radicals, having from 1 to 6 carbon atoms in the alkylene radicals, preferably having from 2 to 4 carbon atoms in the alkylene radical, have an excellent fire-proofing properties and can be prepared without difficulties.

The phosphorus compounds which are contained in the fire proof polyesters of the invention are thermally stable, they neither decompose saturated polyesters in the processing nor do they influence the preparation of such thermoplasts. Because of the salt-like character they are not volatile under the preparation and processing conditions for polyesters.

The following are cited as examples of the phosphorus compounds which may be used in the polyester composition of the invention: the alkali salts of dimethyl-phosphinic acid, methylethyl-phosphinic acid, methylpropyl-phosphinic acid methyl-hexyl-phosphinic acid, ethyl-phenylphosphinic acid, diethyl-phosphinic acid or respectively the dialkali salts of ethane -1,2-di-(methyl-phosphinic acid), ethane-1,2-di-(ethyl-phosphinic acid), ethane-1,2-di-(phenylphosphinic acid) and butane -1,2-di-(methyl-phosphinic acid).

Especially preferred are the sodium salts of the phosphinic acids, especially of dimethyl-phosphinic acid and ethane-1,2-di-(methyl-phosphinic acid). The quantity of phosphinic acid salt is, depending on polyester and fire retarding requirement, in general, from 5.5 to 35 percent by weight, preferably from 6 to 30 percent by weight, calculated on the weight of the polymer. To obtain an approximately equal fire retarding effect normally less phosphinic acid salts are required with the polyethylene terephthalate than, for example, with polybutylene terephthalate.

As linear saturated polyesters the moulding compositions should preferably contain a polyalkylene-terephthalate, especially polyethylene-terephthalate, polypropylene-terephthalate or polybutylene terephthalate.

Instead of polyalkylene-terephthalate modified polyalkylene-terephthalates can also be used, which contain, as well as terephthalic acid, also other aromatic or aliphatic dicarboxylic acids as acid components, for example, isophthalic acid, naphthalene-2,6-dicarboxylic acid or adipic acid. Furthermore, the polyesters of the invention also comprise modified polyalkylene-terephthalates which contain, in addition to ethylene-glycol propanediol or butane-diol, as alcohol component other diols, for example, 1,4-dimethylol-cyclohexane or neopentylglycol. The quantity of modifying acid or diol components should not exceed approximately 10 percent in moles, calculated on the total quantity of dicarboxylic acid or diol.

The polyester part of the moulding composition has a reduced specific viscosity dl/g (measured on a 1% solution in phenol/tetrachlorethane 60 : 40 at 25°) of from 0.5 to 2.0 dl/g, preferably from 0.6 to 1.6.

Also polyesters with lower reduced specific viscosity can be prepared at first and the desired viscosity obtained by subsequent condensation optionally in the solid phase.

The preparation, for example, of the polyalkylene terephthalate is carried out according to known processes. For example, a low dialkyl-ester of the terephthalic acid, preferably the dimethyl-ester, is used as starting material and this is transesterified with an excess of diol in the presence of suitable catalysts to the bis-hydroxy-alkyl-ester of the terephthalic acid. The temperature is thereby increased from 140°C to 210°C to 220°. The aliphatic alcohol set free is distilled off. For the polycondensation which is carried out at a temperature of from 210°C to 280°C, the pressure is reduced in stages to a value of below 1 mm Hg.

A particular advantage of the invention is that the phosphoric compounds neither influence the preparation nor the processing of the condensates unfavourably.

If diglycol-terephthalate is subjected, for example in the presence of the sodium salt of the dimethylphosphinic acid to a catalytic melt condensation this is not influenced by the foreign additive. The resulting polyester is colourless, has the molecular weight expected, can be subsequently condensed in the solid phase and injection moulded on the usual processing machines.

The addition of the phosphoric compounds at the beginning of the transesterification or melt condensation is not obligatory, they can be introduced at any arbitrary point of the process.

Likewise, it is possible to mix the flame retarding additives with a finished polyester granulate and to process this mixture directly, for example on injection moulding machines, or melt it first in an extruder, granulate and after drying, process into moulded articles.

The flame retarding effect of the salts of phosphinic acids added was tested according to ASTM D 635-68 on bars measuring 127 × 12.7 ×1.3 mm. The polyesters according to the invention are depending on the concentration of the fire proofing agent, self extinguishing or non-combustible. For example, an excellent fire-proofing is obtained with a content of 12.5% of the sodium salt of the dimethylphosphinic acid in polyethylene terephthalate.

In addition to the phosphinic acid salts also inorganic fibre materials can be added to the reaction mixture in the usual quantities, for example, glass fibres, as well as fibres of quartz, asbestos or carbon can be used.

The thickness especially of the glass fibres is from 0.1 to 50. microns, preferably from 3 to 15 microns, their length is from 0.01 to 5 mm, preferably from 0.05 to 1 mm. The quantity of the fibres is up to 50 percent by weight, preferably from 10 to 30 percent by weight, calculated on the flame-proof polyester moulding composition.

Furthermore, the moulding compositions can contain in addition other known additives, such as stabilizers, mould release agents, dyestuffs, fillers, nucleating agents and compounds acting antistatically.

The fire-proof polyesters of the invention are suitable for the preparation of moulded articles, films, filaments and fibres, for example by press-moulding, injection moulding or extrusion. In the case of the injection moulding, for example, of polyethylene terephthalate it is advantageous to heat the mould to a temperature of from 20°C to 160°C, preferably from 100°C to 150°C, since then the polyester portion of the moulding composition crystallizes with the acid of a nucleating agent to a degree which guarantees a high stiffness and hardness of the moulded articles. The moulded articles are further distinguished by low shrinkage and high dimensional stability. Polybutylene terephtalate is injected into the cold form without the addition of nucleating agents.

The polyesters of the invention are especially suitable for the preparation of casings, constructional parts of electrical apparatus, mechanical transmission parts in automatic machines, hollow articles, constructions units in computer equipment and sensitive electronic apparatus, as well as, for sheets, fibres and filaments.

The following examples illustrate the invention.

EXAMPLE 1

A mixture of 1000 parts by weight of dimethylterephthalate 800 parts by weight of ethylene glycol, 0.31 parts by weight of manganese acetate was gradually brought to 225°C while stirring, methanol was distilled off over a column until the conclusion of the transesterification. After adding 150 parts by weight of the sodium salt of the dimethyl phosphinic acid and 0.35 parts by weight of germanium phosphite the polycondensation was carried out by raising the temperature to 275°C at a final pressure of 0.1 mm Hg.

The finished polyester had a reduced specific viscosity of 0.77 dl/g. After being removed from the condensation vessel the polyester filament was granulated and the granulate was brought by solid condensation at 240°C and 0.1 to 0.2 mm Hg to a reduced specific viscosity of 1.47 dl/g. It was possible to mould the polyester granulate perfectly to plates 1.3 mm thick at a temperature of between 230°C and 250°C and a pressure of from 5 to 100 atmospheres. From these testing bars were cut with the measurements 127 × 12.7 mm. The flame retarding effect could be seen on these testing bodies according to ASTM D 625-68. The values are summarized in table 1.

EXAMPLE 2

790 parts by weight of dimethyl-terephthalate, 790 parts by weight of butane-diol-1,4 and 340 parts by weight of the sodium salt of the dimethyl-phosphinic acid were heated under nitrogen atmosphere to 210°C and mixed with a ti-catalyst. The methanol set free was distilled off while stirring until the conclusion of the transesterification reaction over a column. The temperature was increased slowly to 230°C and at the same time evacuated to the final vacuum of 0.1 mm Hg. After obtaining the final vacuum the temperature was increased slowly to the final value of 260°C. The polyester which had been removed and granulated as in Example 1 had a reduced specific viscosity of 1.26 dl/g.

The burning behaviour test was carried out as in Example 1. The result is given in table 1.

EXAMPLE 3

Polyethylene terephthalate was mixed homogenously in ground form with 11 percent by weight of the disodium salt of the ethane-1,2-di-(methyl-phosphinic acid) and subsequently press moulded to plates as in Example 1 and the testing bars prepared from them were tested according to ASTM D 635-68.

EXAMPLE 4 (Comparative example)

Polyethylene terephthalate was prepared, as described in Example 1, but without the additon of the phosphinic acid salt and was tested according to ASTM D 635-68.

EXAMPLE 5 (Comparative example)

Polybutylene terephthalate was prepared, as described in Example 2, but without the addition of the phosphinic acid salt and was subjected to the combustibility test according to ASTM D 635-68.

| Example | Polyester | RSV press plate DL/ | Additive | % by weight additive | Estimation according to ASTM D 635-68 |
|---|---|---|---|---|---|
| 1 | Polyethylene terephthalate | 0,68 | sodium salt of the dimethyl-phosphinic acid | 12,5 | non-combustible |
| 2 | Polybutylene terephthalate | 1,17 | sodium salt of the dimethyl-phosphinic acid | 28 | non-combustible |
| 3 | Polyethylene terephthalate | 0,73 | di-sodium salt of the ethane-1,2-di-(methyl phosphinic acid | 11 | non-combustible |
| 4 | Polyethylene terephthalate | 0,86 | — | — | combustible |
| 5 | Polybutylene terephthalate | 1,05 | — | — | combustible |

What is claimed is:

1. A flame resisting thermoplastic polyester consisting essentially of a polyalkylene terephthalate which may contain up to 10 mole % based on the total dicarboxylic acid and diol units in said polyester of units derived from a dicarboxylic acid other than terephthalic acid and up to 10 mole % of units derived from a diol other than an alkylene diol, containing an effective flame-retarding amount of a flame-retarding compound of the formula

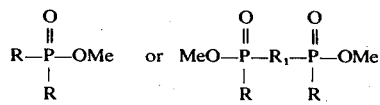

wherein Me represents an alkali metal, R represents the same or different alkyl radicals of 1 to 6 carbon atoms, and $R_1$ represents an alkylene radical of 2 to 4 carbon atoms.

2. A polyester composition as claimed in claim 1 characterized in that the concentration of fire-retarding agent is between 5.5 and 35% by weight, based on the weight of the polyester.

3. A thermoplastic composition as claimed in claim 1 wherein the linear saturated polyester has a reduced specific viscosity of 0.5 to 2.5 dl/g.

4. A thermoplastic molding composition as claimed in claim 1 and containing a fibrous reinforcing filler in an amount up to 50% by weight of said composition.

5. A thermoplastic composition according to claim 4 wherein said fibrous reinforcement is glass fibers.

6. Films, filaments and fibers made from the thermoplastic composition of claim 1.

* * * * *